United States Patent
Natanzon (10) Patent No.: US 11,599,423 B1
(45) Date of Patent: Mar. 7, 2023

(54) MANAGING BACKUP COPIES IN A RIGHT-TO-DELETE PERSONAL DATA ENVIRONMENT

(71) Applicant: EMC IP Holding Company LLC, Hopkinton, MA (US)

(72) Inventor: Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/120,889

(22) Filed: Sep. 4, 2018

(51) Int. Cl.
*G06F 11/14* (2006.01)

(52) U.S. Cl.
CPC ...... *G06F 11/1469* (2013.01); *G06F 11/1451* (2013.01); *G06F 11/1453* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2006/0047931 A1* | 3/2006 | Saika | ................. | G06F 11/1451 711/162 |
| 2016/0162364 A1* | 6/2016 | Mutha | .................. | G06F 16/113 707/645 |
| 2018/0247320 A1* | 8/2018 | Gauld | ................ | G06Q 30/0201 |
| 2018/0373604 A1* | 12/2018 | Martin | .................. | G06F 16/219 |

* cited by examiner

*Primary Examiner* — Amresh Singh
(74) *Attorney, Agent, or Firm* — Dergosits & Noah LLP; Todd A. Noah (57) ABSTRACT

Managing backup copies in a right to delete personal data environment is described. A system creates a revised backup copy by deleting any data that a deletion request ledger specifies for deletion from a backup copy that was created for a data object. The system associates an updating time with the revised backup copy. The system retrieves the revised backup copy in response to receiving a restoration request corresponding to the revised backup copy. The system enables restoration of the data object by deleting any data i) that the deletion request ledger specifies for deletion from the revised backup copy and ii) that is associated with a deletion request time which is subsequent to the updating time.

20 Claims, 3 Drawing Sheets

MANAGING BACKUP COPIES IN A RIGHT-TO-DELETE PERSONAL DATA ENVIRONMENT

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

A data object and/or a backup file may be stored on cloud storage, which is a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, and/or application data. Cloud storage services may be accessed through a co-located cloud computer service, a web service application programming interface (API), or by applications that utilize a web service API, such as cloud desktop storage, a cloud storage gateway, or Web-based content management systems.

While this disclosure uses backup files as examples, the procedures discussed apply to general data management operations. In the most general case of storing backup files in cloud storage, a typical backup/restore application reads data on a client system, optionally de-duplicates/compresses the backup data, catalogues the backup data, and sends the backup data to a cloud storage gateway, which exposes a file system interface backed by the cloud storage. Any data written to the file system interface exposed by the cloud storage gateway ends up getting written to the cloud storage. Often the cloud storage gateway is an intelligent device (like Maginatics or SteelStore) and has built-in de-duplication/compression capabilities.

DETAILED DESCRIPTION

The General Data Protection Regulation (EU)2016/679 is a regulation in European Union law on data and privacy for all people within the European Union, which also addresses the export of personal data outside the European Union. The regulation aims primarily to give control to people over their personal data and to simplify the regulatory environment for international business within the European Union. Superseding the Data Protection Directive 95/46/EC, the regulation contains provisions and requirements pertaining to the processing of personally identifiable information (personal data) of people inside the European Union, and also applies to any enterprise established in the European Union—regardless of its location and the people's citizenship—that is processing the personal data of people inside the European Union. Controllers of personal data must put in place appropriate technical and organizational measures to implement the data protection principles. A "right to be forgotten" was replaced by a more limited "right of erasure" in the version of the regulation that was adopted by the European Parliament in March 2014. Article 17 provides that a person has the right to request deletion of personal data related to them on any one of a number of grounds, such as if the personal data is inadequate, irrelevant or no longer relevant, and if the legitimate interests of the controller are overridden by the interests or fundamental rights and freedoms of the person, which require protection of personal data. A controller of personal data may evaluate each request to delete personal data on a case-by-case basis by determining whether the personal data is in the public interest. Determining whether personal data is in the public interest may be complex and may require considering many diverse factors, such as whether the personal data relates to the requesting person's professional life, a past crime, political office, position in public life, or whether the personal data is self-authored content, consists of government documents, or is journalistic in nature. Public authorities and businesses whose core activities center around regular or systematic processing of personal data are required to employ a data protection officer, who is responsible for managing compliance with the regulation, which was adopted on Apr. 14, 2016, and then became enforceable beginning May 25, 2018.

The General Data Protection Regulation does not specify what happens to backup copies of personal data that a person had the right to be deleted and requested to be deleted. As the amount of personal data increases over time, the personal data representing people will continue to be stored in backup copies. If there is a data loss in a system that is protected by backup copies, the system may be restored to its state a previous point in time, in which case the system's data may include data that a person had the right to be deleted and requested to be deleted. Even if a system can re-delete the requested personal data, this procedure may take significant amounts of time. Since violators of the regulation may be fined up to €20 million or up to 4% of the annual worldwide turnover of the preceding financial year in case of an enterprise, whichever is greater, personal data that a person had the right to be deleted and requested to be deleted needs to be deleted from backup copies to ensure compliance with the regulation.

Embodiments herein enable managing backup copies in a right to delete personal data environment. A system creates a revised backup copy by deleting any data that a deletion request ledger specifies for deletion from a backup copy that was created for a data object. The system associates an updating time with the revised backup copy. The system retrieves the revised backup copy in response to receiving a restoration request corresponding to the revised backup copy. The system enables restoration of the data object by deleting any data i) that the deletion request ledger specifies for deletion from the revised backup copy and ii) that is associated with a deletion request time which is subsequent to the updating time.

For example, on Jul. 31, 2018, a backup/restore application accesses a deletion request ledger that stores 650,000 requests to delete personal data, identifies some of the personal data in an index for a database's backup file created on Jul. 1, 2018, deletes the identified personal data from the July 1 database backup file to create a revised July 1 database backup file, and similarly revises the July $2^{nd}$ through July $31^{st}$ database backup files, as needed. The backup/restore application records the updating time for the revised July database backup files as Jul. 31, 2018. On Aug. 1, 2018, the backup/restore application retrieves the revised July 1 database backup file that was revised on July 31, because a system administrator requested that the database be restored to its state on Jul. 1, 2018. The backup/restore application accesses the deletion request ledger, which stores 500 requests to delete personal data that were received after the July 31 updating time, identifies some of the personal data in the index for the revised July 1 database backup file, and deletes the identified personal data from the revised July 1 database backup file to create a revised Jul. 1, 2018 database backup file that is revised on Aug. 1, 2018. Then the backup/restore application uses the revised July 1 database backup file that is revised on August 1 to restore the database to the state the database was in on Jul. 1, 2018, with the exception of the deleted personal data. Since the backup/restore application previously deleted the personal data from the database backup files based on the deletion request ledger's oldest 650,000 deletion requests, the database backup files did not store any data that should have been previously deleted. Furthermore, the backup/restore application's restoration of the database required deletions of the revised database backup file's personal data based on only the deletion request ledger's newest 500 deletion requests, which is a relatively small number of requests compared to the 650,000 older requests, thereby ensuring a quick restoration of the database.

Figure 1:
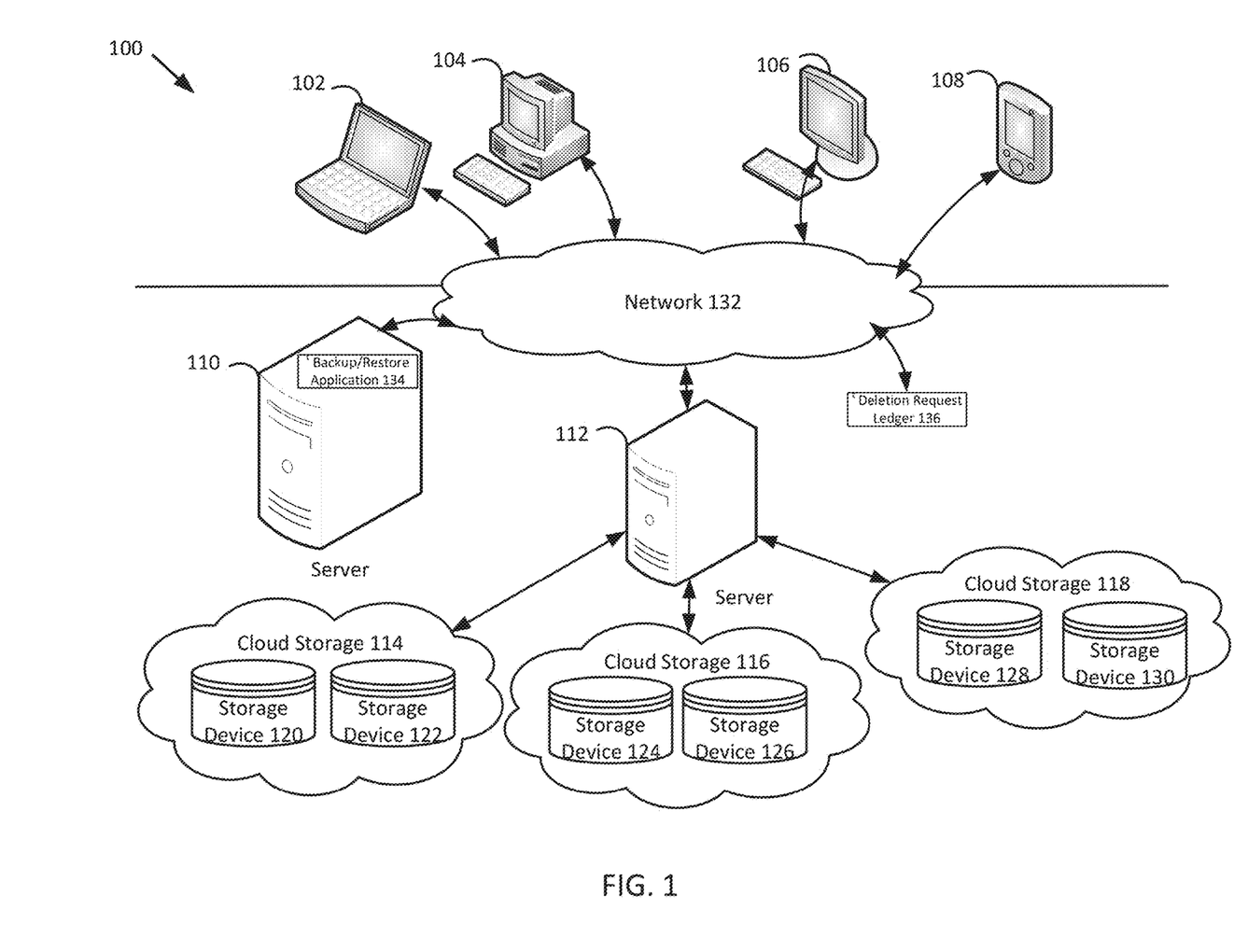
FIG. 1 illustrates a block diagram of an example system for managing backup copies in a right to delete personal data environment, under an embodiment.

FIG. 1 illustrates a diagram of a system for managing backup copies in a right to delete personal data environment, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a first server 110, a second server 112, a first cloud storage 114, a second cloud storage 116, and a third cloud storage 118, that may be provided by a hosting company. Although FIG. 1 depicts the first client 102 as a laptop computer 102, the second client 104 as a personal computer 104, the third client 106 as an Apple® Macintosh computer 106, and the fourth client 108 as a smartphone 108, each of the clients 102-108 may be any type of computer, such as a server. The first cloud storage 114 includes a first storage device 120 and a second storage device 122, the second cloud storage 116 includes a third storage device 124 and a fourth storage device 126, and the third cloud storage 118 includes a fifth storage device 128 and a sixth storage device 130. The clients 102-108 and the servers 110-112 communicate via a network 132. Although FIG. 1 depicts the system 100 with four clients 102-108, two servers 110-112, three cloud storages 114-118, six storage devices 120-130, and one network 132, the system 100 may include any number of clients 102-108, any number of servers 110-112, any number of cloud storages 114-118, any number of storage devices 120-130, and any number of networks 132. The clients 102-108 and the servers 110-112 may each be substantially similar to the system 300 depicted in FIG. 3 and described below.

The first server 110, which may be referred to as a backup server 110, includes a backup/restore application 134 that can create backup files of the data and the metadata of the clients 102-108, store the backup files as backup files on any of the storage devices 120-130, and execute a restoration based on the backup files. The backup/restore application 134 may provide centralized administration, such as scheduling, monitoring, and managing backup operations and backup files. The backup/restore application 134 can enable the storing of backup operation schedules, client policies, and client configurations. The backup/restore application 134 may maintain a local database of all processes that execute on the backup server 110. The backup/restore application 134 can execute server-side processes for a system administrator's graphical management console, which may enable the system administrator to use command line interface tools for queries. For example, a system administrator identifies the clients 102-108 registered with the backup server 110.

Although FIG. 1 depicts the backup/restore application 134 residing completely on the backup server 110, the backup/restore application 134 may reside in any combination of partially on the backup server 110, partially on the clients 102-108, and/or partially elsewhere. Even though the following paragraphs describe EMC Corporation's Avamar® backup/restore application and EMC Corporation's NetWorker® backup/restore application as examples of the backup/restore application 134, the backup/restore application 134 may be any other backup/restore application which provides the backup/restore functionalities described in the Background section.

The backup/restore application 134 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The backup/restore application 134 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 112, which may be referred to as a cloud storage gateway 112, may be a network appliance or server which resides at a customer's premises, and can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System Interface (iSCSI), Fibre Channel, and file based interfaces such as Network File System (NFS) and Server Message Block (SMB), one version of which is also known as Common Internet File System (CIFS). A file system interface may be an API (application programming interface) through which a utility or user program requests the storing and retrieving of data. The cloud storage gateway 110 can also serve as an intermediary to multiple cloud storage providers.

The first cloud storage 114 may be a Google® cloud platform, the second cloud storage 116 may be an Amazon Web Services® cloud platform, and the third cloud storage 118 may be a Microsoft® Azure cloud platform. The system 100 includes a deletion request ledger 136 that records requests to delete personal data that are received from a deletion requesting device, such as the fourth client 108. Although FIG. 1 depicts the system 100 with one deletion requesting device 108, the system 100 may include any number of deletion requesting devices 108. Although FIG. 1 depicts the deletion requesting device as the smartphone 108, the deletion requesting device may be any type of computer. The deletion request ledger 136 may be a blockchain, which is a growing list of records, called blocks, which are linked using cryptography, and may be implemented using any common blockchain technology, such as Hyperledger, Ethereum, and MultiChain. When used as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Therefore, the deletion request ledger 136 may be a blockchain, or the immutable distributed deletion request ledger 136, that stores any request to delete specific data, and also prevents deletion of any request to delete specific data once the immutable distributed deletion request ledger 136 has become immutable.

The deletion request ledger 136 can be accessed by a data protection system, such as the backup/restore application 134, to get the list of requested deletions. When the deletion requesting device 108 and the backup/restore application 134 send log events to the portal for the deletion request ledger 136, the log events may be in a format that is native to the deletion requesting device 108 and the backup/restore application 134, respectively. Alternatively, agents of the deletion request ledger 136 can modify the deletion requesting device 108 and/or the backup/restore application 134 to send log events in a format that is native to the deletion request ledger 136 to the portals for the deletion request ledger 136. The deletion request ledger 136 includes an application programming interface (API) that records those operations.

A deletion request ledger can store a request to delete specific data in response to receiving a request to delete specific data. For example, and without limitation, this can include the deletion request ledger 136 storing Mario Gonzalez's request to delete 16-year-old data about his home foreclosure in response to receiving his request to delete his old foreclosure data. A request can be an instruction to a computer to provide information or a service. Specific data can be identified information. A deletion request ledger can be a log that records instructions to a computer to erase information. A distributed deletion request ledger can be logs that are located on different networked computers and that record instructions to a computer to erase information. Cloud storage can be a model of data storage in which digital data is stored in logical pools.

In addition to continuously updating the deletion request ledger, the system periodically creates a revised backup copy by deleting any data that the deletion request ledger specifies for deletion from a backup copy that was created for a data object. By way of example and without limitation, this can include the backup/restore application 134 accessing the deletion request ledger 136 on Jul. 31, 2018. On Jul. 31, 2018, the deletion request ledger 136 stores 650,000 requests to delete personal data. The backup/restore application 134 identifies some of the personal data in an index for a database's backup file created on Jul. 1, 2018, deletes the identified personal data from the database's July 1 backup file to create a revised July 1 backup file for the database, and similarly revises the July $2^{nd}$ through July $31^{st}$ backup files for the database, as needed. A backup copy can be a record of at least some of the information needed to restore a data object to a state at a specific time when the information was recorded. Data can be information. A data object can be a collection or a group of information that is backed up as a unit, such as the information for a computer or a network of computers. A revised backup copy can be an altered version of a record of at least some of the information needed to restore a data object to a state at a specific time when the information was recorded.

The revised backup copy may be created periodically. For example, each day the backup/restore application 134 identifies new deletion requests that were not previously stored in the deletion request ledger 136, determines if any database backup files store the personal data identified by the new deletion requests, deletes the identified personal data from any database backup file that stores the identified personal data to create a newly revised version of any database backup file that stores the identified personal data. The backup/restore application 134 does not create a newly revised version of any backup file that does not store the identified personal data, such that the backup file version remains the same for any backup file that does not store the identified personal data. Periodically can be occasionally, or at regularly occurring intervals.

Creating the revised backup copy may include creating multiple revised backup copies by deleting any data that the deletion request ledger specifies for deletion from multiple corresponding backup copies. For example, Acme Real Estate Corporation stores a person-based real estate database in the laptop 102, backup files of this person-based database in the Google® cloud platform 114, a property-based real estate database in the personal computer 104, backup files of this property-based database in the Amazon Web Services® cloud platform 116, a business-based real estate database in the Apple® Macintosh computer 106, and backup files of this business-based database in the Microsoft® Azure cloud platform 118. After accessing the blockchain 136 on Jul. 31, 2018, the backup/restore application 134 identifies some of the personal data in the index for the person-based database's backup file created on Jul. 1, 2018, and then deletes the identified personal data from the July 1 person-based database backup file stored in the Google® cloud platform 114 to create a revised July 1 person-based database backup file in the Google® cloud platform 114. Similarly, the backup/restore application 134 identifies some of the personal data in the index for the property-based database's backup file created on Jul. 1, 2018, and then deletes the identified personal data from the July 1 property-based database backup file stored in the Amazon Web Services® cloud platform 116 to create a revised July 1 property-based database backup file in the Amazon Web Services® cloud platform 116. Likewise, the backup/restore application 134 identifies some of the personal data in the index for the business-based database's backup file created on Jul. 1, 2018, and then deletes the identified personal data from the July 1 business-based database backup file stored in the Microsoft® Azure cloud platform 118 to create a revised July 1 business-based database backup file in the Microsoft® Azure cloud platform 118.

Following the revising of the backup copies, the system associates an updating time with a revised backup copy. In embodiments, this can include the backup/restore application 134 recording the updating time for the revised July 1 database backup file as Jul. 31, 2018. Even if the backup/restore application 134 does not revise the July 2 database backup file, the backup/restore application 134 still records the updating time for the July 2 database backup file as Jul. 31, 2018 because the backup/restore application 134 used deletion requests that have deletion request times of Jul. 31, 2018, or older to evaluate any potential deletions of personal data from the July 2 database backup file. An updating time can be the moment of occurrence for incorporating new information, such as altering a backup copy of a data object or determining whether a backup copy needs to be altered.

Having revised the backup copies, the system retrieves a revised backup copy in response to receiving a restoration request corresponding to the revised backup copy. For example, and without limitation, this can include the backup/restore application 134 retrieving the revised July 1 database backup file that was revised on July 31, because a system administrator requested that the database be restored to its state on Jul. 1, 2018. In another example, the backup/restore application 134 retrieves the revised July 1 person-based database backup file that was revised on July 31 from the Google® cloud platform 114 because a system administrator requested that the person-based database be restored to its state on Jul. 1, 2018. A restoration request can be an instruction to a computer to return a data object to its former condition.

After retrieving a revised backup copy, the system enables restoration of the data object by deleting any data i) that the deletion request ledger specifies for deletion from the revised backup copy and ii) that is associated with a deletion request time which is subsequent to the updating time. By way of example and without limitation, this can include the backup/restore application 134 accessing the deletion request ledger 136, which stores 500 requests to delete personal data that were received after the July 31 updating of database backup files, identifies some of the personal data in the index for the revised July 1 database backup file, and deletes the identified personal data from the revised July 1 database backup file to create a revised Jul. 1, 2018, database backup file that is revised on Aug. 1, 2018. Then the backup/restore application 134 uses the revised July 1 database backup file that is revised on August 1 to restore the database to the state the database was in on Jul. 1, 2018, with the exception of the deleted personal data.

Enabling restoration of the data object may include deleting any recent data that the deletion request ledger specifies for deletion from multiple revised backup copies. For example, the backup/restore application 134 uses the July 1 person-based database backup file revised on August 1 to restore the person-based database to its state on Jul. 1, 2018, uses the July 1 property-based database backup file revised on August 1 to restore the property-based database to its state on Jul. 1, 2018, and uses the July 1 business-based database backup file revised on August 1 to restore the business-based database to its state on Jul. 1, 2018, with all restorations excluding the deleted personal data. Recent data can be information belonging to a past period of time comparatively close to the present.

Completing the previous example, Mr. Gonzalez can use the deletion requesting device 108 to access the deletion request ledger 136, which includes a log entry that specifies that his deletion request has been approved and that the data about his home foreclosure has been deleted. Further to this example, the blockchain 136 includes a log entry that specifies that Acme Real Estate Corporation deleted the requested data from Acme's person-based database backup files stored in the Google® cloud platform 114, and from Acme's property-based database backup files stored in the Amazon Web Services® cloud platform 116. In this example, the blockchain 136 did not include a log entry that specifies that Acme Real Estate Corporation deleted the requested data from Acme's business-based database backup files stored in the Microsoft® Azure cloud platform 118 because Acme's business-based database did not store Mr. Gonzalez's personal data. Since the backup/restore application 134 previously deleted the personal data from the database backup files based on the deletion request ledger's 136 oldest 650,000 deletion requests, the database backup files did not store any data that should have been previously deleted. Furthermore, the backup/restore application's 134 restoration of the database required deletions of the revised database backup file's personal data based on only the deletion request ledger's 136 newest 500 deletion requests, which is a relatively small number of requests compared to the 650,000 older requests, thereby ensuring a quick restoration of the database. A deletion request time can be the moment of occurrence for an instruction to a computer to erase information.

Figure 2:
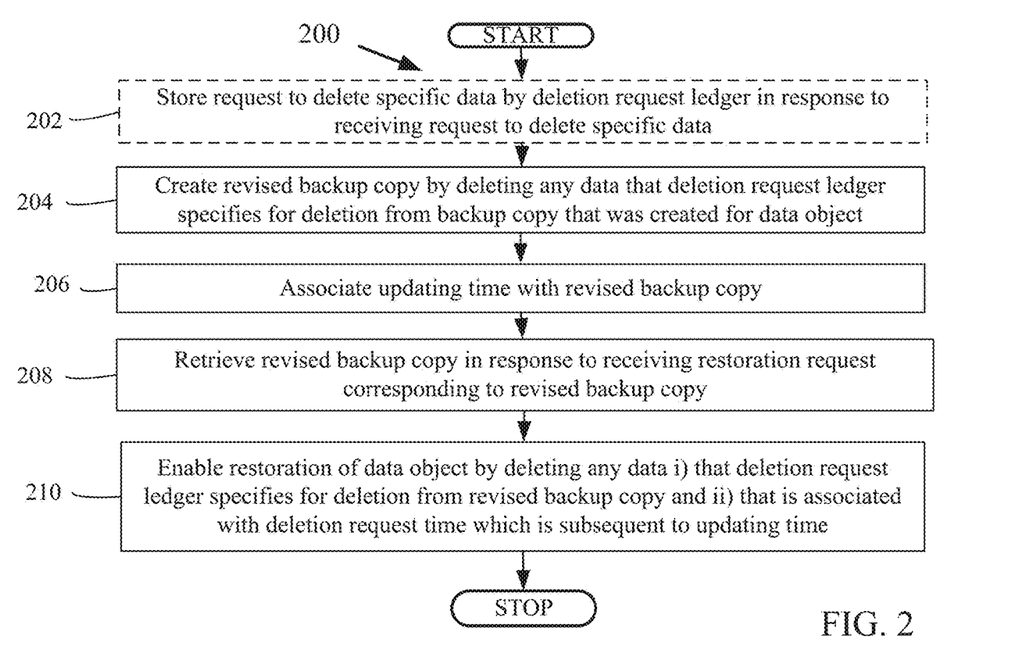
FIG. 2 is a flowchart that illustrates a method of managing backup copies in a right to delete personal data environment, under an embodiment.

FIG. 2 is a flowchart that illustrates a method for managing backup copies in a right to delete personal data environment, under an embodiment. Flowchart 200 illustrates method acts illustrated as flowchart blocks for certain steps involved in and/or between the clients 102-108 and/or the servers 110-112 of FIG. 1.

A request to delete specific data is optionally stored by a deletion request ledger in response to receiving a request to delete specific data, block 202. The system stores requests to delete data in a deletion request ledger. For example, and without limitation, this can include the deletion request ledger 136 storing Mario Gonzalez's request to delete 16-year-old data about his home disclosure in response to receiving his request to delete his old foreclosure data.

In addition to continuously updating the deletion request ledger, a revised backup copy is periodically created by deleting any data that the deletion request ledger specifies for deletion from a backup copy that was created for a data object, block 204. The system deletes requested personal data from a database's backup files. By way of example and without limitation, this can include the backup/restore application 134 accessing the deletion request ledger 136 on Jul. 31, 2018, which stores 650,000 requests to delete personal data, identifying some of the personal data in an index for a database's backup file created on Jul. 1, 2018, deletes the identified personal data from the July 1 database backup file to create a revised July 1 database backup file, and similarly revises the July $2^{nd}$ through July $31^{st}$ database backup files, as needed.

Following the revising of the backup copies, an updating time is associated with a revised backup copy, block 206. The system records when backup files were updated. In embodiments, this can include the backup/restore application 134 recording the updating time for the revised July database backup files as Jul. 31, 2018.

Having revised the backup copies, a revised backup copy is retrieved in response to receiving a restoration request corresponding to the revised backup copy, block 208. The system retrieves any revised backup files needed for restoration. For example, and without limitation, this can include the backup/restore application 134 retrieving the revised July 1 database backup file that was revised on July 31, because a system administrator requested that the database be restored to its state on Jul. 1, 2018.

After retrieving a revised backup copy, restoration of a data object is enabled by deleting any data i) that the deletion request ledger specifies for deletion from the revised backup copy and ii) that is associated with a deletion request time which is subsequent to the updating time, block 210. The system uses revised backup files to restore databases. By way of example and without limitation, this can include the backup/restore application 134 accessing the deletion request ledger 136, which stores 500 requests to delete personal data that were received after the July 31 updating of database backup files, identifies some of the personal data in the index for the revised July 1 database backup file, and deletes the identified personal data from the revised July 1 database backup file to create a revised Jul. 1, 2018 database backup file that is revised on Aug. 1, 2018. Then the backup/restore application 134 uses the revised July 1 database backup file that is revised on August 1 to restore the database to the state the database was in on Jul. 1, 2018, with the exception of the deleted personal data.

Although FIG. 2 depicts the blocks 202-210 occurring in a specific order, the blocks 202-210 may occur in another order. In other implementations, each of the blocks 202-210 may also be executed in combination with other blocks and/or some blocks may be divided into a different set of blocks.

Figure 3:
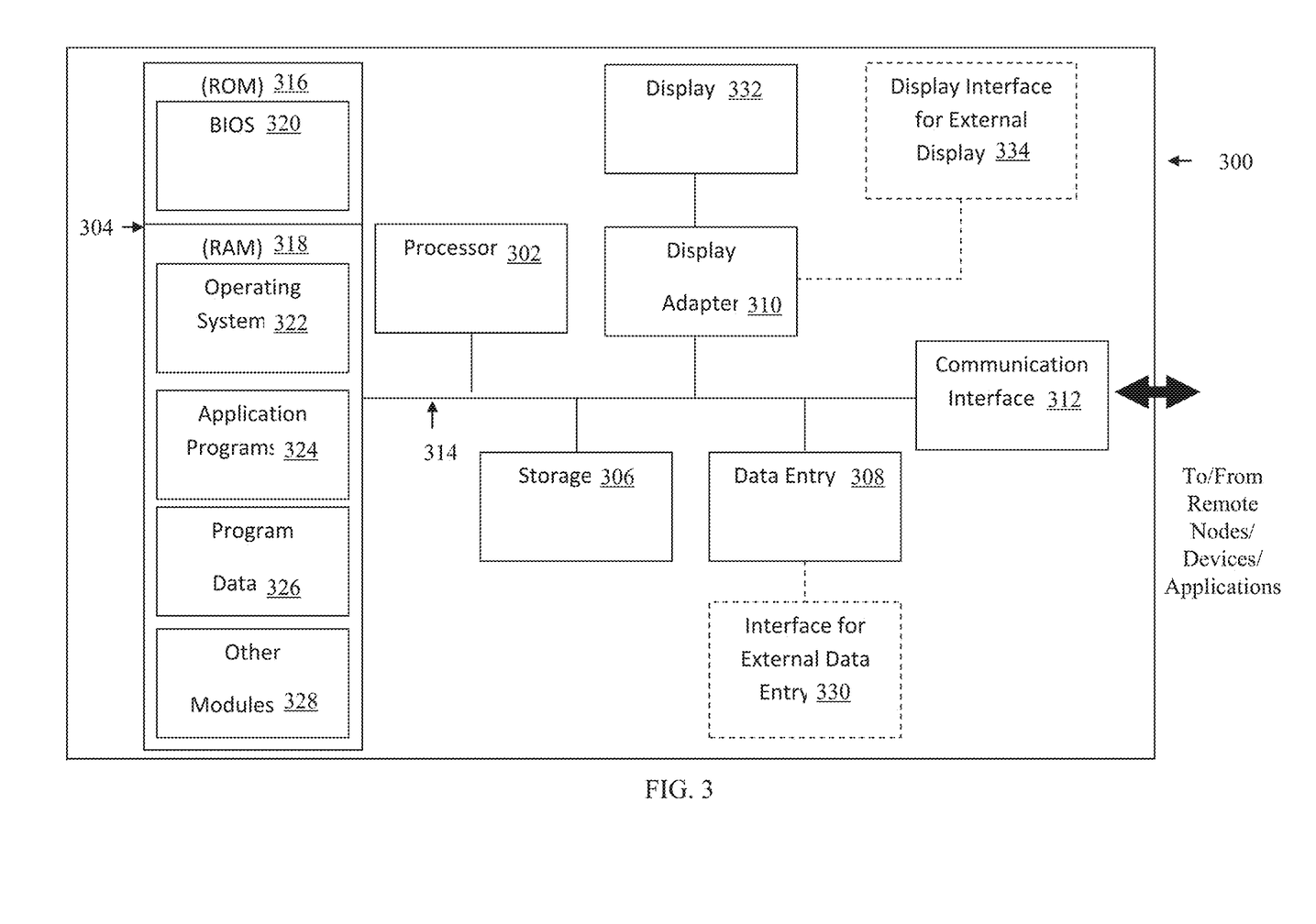
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause the one or more processors to:
create at least one revised backup copy by deleting data within each backup copy created for a data object, without waiting for any additional criteria for revising the backup copy to be met, in response to a deletion request received from a deletion request ledger, the deletion request ledger specifying the data to be deleted;
associate an updating time with each revised backup copy;
retrieve at least one revised backup copy in response to receiving a restoration request corresponding to the at least one revised backup copy; and
enable restoration of the data object by deleting, from the at least one revised backup copy, data that is: i) specified by the deletion request ledger for deletion, and ii) associated with at least one deletion request having a deletion request time that is subsequent to the updating time associated with each revised backup copy.

2. The system of claim 1, wherein the plurality of instructions further causes the processor to store a request to delete specific data by the deletion request ledger in response to receiving the request to delete the specific data.

3. The system of claim 2, wherein the deletion request ledger comprises an immutable distributed deletion request ledger.

4. The system of claim 3, wherein the immutable distributed deletion request ledger prevents deletion of the request to delete the specific data after the immutable distributed deletion request ledger has become immutable.

5. The system of claim 1, wherein creating the at least one revised backup copy comprises creating a plurality of revised backup copies by deleting any data that the deletion request ledger specifies for deletion from a corresponding plurality of backup copies.

6. The system of claim 5, wherein the at least one revised backup copy is created periodically.

7. The system of claim 1, wherein enabling restoration of the data object comprises deleting any recent data that the deletion request ledger specifies for deletion from a plurality of revised backup copies.

8. A method comprising:
creating at least one revised backup copy by deleting data within each backup copy created for a data object, without waiting for any additional criteria for revising the backup copy to be met, in response to a deletion request received from a deletion request ledger;
associating an updating time with each revised backup copy;
retrieving at least one revised backup copy in response to receiving a restoration request corresponding to the at least one revised backup copy; and
enabling restoration of the data object by deleting, from the at least one revised backup copy, data that is: i) specified by the deletion request ledger for deletion, and ii) associated with at least one deletion request having a deletion request time that is subsequent to the updating time associated with each revised backup copy.

9. The computer-implemented method of claim 8, wherein the computer-implemented method further comprises storing a request to delete specific data by the deletion request ledger in response to receiving the request to delete the specific data.

10. The computer-implemented method of claim 9, wherein the deletion request ledger comprises an immutable distributed deletion request ledger.

11. The computer-implemented method of claim 10, wherein the immutable distributed deletion request ledger prevents deletion of the request to delete the specific data after the immutable distributed deletion request ledger has become immutable.

12. The computer-implemented method of claim 8, wherein creating the at least one revised backup copy comprises creating a plurality of revised backup copies by deleting any data that the deletion request ledger specifies for deletion from a corresponding plurality of backup copies.

13. The computer-implemented method of claim 12, wherein the at least one revised backup copy is created periodically.

14. The computer-implemented method of claim 8, wherein enabling restoration of the data object comprises deleting any recent data that the deletion request ledger specifies for deletion from a plurality of revised backup copies.

15. A computer program product, comprising a non-transitory computer-readable medium having a computer-readable program code embodied therein to be executed by one or more processors, the program code including instructions to:
create at least one revised backup copy by deleting data within each backup copy created for a data object, without waiting for any additional criteria for revising the backup copy to be met, in response to a deletion request received from a deletion request ledger;
associate an updating time with each revised backup copy;
retrieve at least one revised backup copy in response to receiving a restoration request corresponding to the at least one revised backup copy; and
enable restoration of the data object by deleting, from the at least one revised backup copy, data that is: i) specified by the deletion request ledger for deletion, and ii) associated with at least one deletion request having a deletion request time that is subsequent to the updating time associated with each revised backup copy.

16. The computer program product of claim 15, wherein the program code includes further instructions to store a request to delete specific data by the deletion request ledger in response to receiving the request to delete the specific data.

17. The computer program product of claim 16, wherein the deletion request ledger comprises an immutable distributed deletion request ledger.

18. The computer program product of claim 17, wherein the immutable distributed deletion request ledger prevents deletion of the request to delete the specific data after the immutable distributed deletion request ledger has become immutable.

19. The computer program product of claim 15, wherein creating the at least one revised backup copy comprises creating a plurality of revised backup copies by deleting any data that the deletion request ledger specifies for deletion from a corresponding plurality of backup copies, and the at least one revised backup copy is created periodically.

20. The computer program product of claim 15, wherein enabling restoration of the data object comprises deleting any recent data that the deletion request ledger specifies for deletion from a plurality of revised backup copies.

\* \* \* \* \*